US011093050B2

(12) United States Patent
Yang et al.

(10) Patent No.: US 11,093,050 B2
(45) Date of Patent: Aug. 17, 2021

(54) ELECTRONIC PEN AND INCLINED HANDWRITING ADJUSTMENT METHOD THEREOF, INCLINED HANDWRITING ADJUSTMENT SYSTEM, AND ADJUSTMENT METHOD THEREOF

(71) Applicants: Hefei BOE Optoelectronics Technology Co., Ltd., Hefei (CN); BOE Technology Group Co., Ltd., Beijing (CN)

(72) Inventors: Guanglei Yang, Beijing (CN); Zhixiang Fang, Beijing (CN); Jian He, Beijing (CN); Zhen Tang, Beijing (CN); Peng Ding, Beijing (CN); Meng Wang, Beijing (CN); Chunhua Li, Beijing (CN); Xuxu Hu, Beijing (CN)

(73) Assignees: Hefei BOE Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/631,234

(22) PCT Filed: May 29, 2019

(86) PCT No.: PCT/CN2019/089097
§ 371 (c)(1),
(2) Date: Jan. 15, 2020

(87) PCT Pub. No.: WO2019/228422
PCT Pub. Date: Dec. 5, 2019

(65) Prior Publication Data
US 2020/0218367 A1    Jul. 9, 2020

(30) Foreign Application Priority Data

May 30, 2018   (CN) .......................... 201810541607.9
Mar. 25, 2019  (CN) .......................... 201910229446.4

(51) Int. Cl.
*G06F 3/0346*    (2013.01)
*G06F 3/0354*    (2013.01)
(Continued)

(52) U.S. Cl.
CPC ............. *G06F 3/0346* (2013.01); *G01B 7/30* (2013.01); *G06F 3/0383* (2013.01); *G06F 3/03545* (2013.01)

(58) Field of Classification Search
CPC .. G06F 3/0346; G06F 3/03545; G06F 3/0383; G06F 3/0354; G01B 7/30
See application file for complete search history.

(56) References Cited

U.S. PATENT DOCUMENTS 5,696,538 A      12/1997 Kishi
2011/0085060 A1   4/2011 Liu
(Continued)

FOREIGN PATENT DOCUMENTS

CN    102035987 A    4/2011
CN    102591481 A    7/2012
(Continued)

OTHER PUBLICATIONS

Nov. 21, 2019—(CN) First Office Action Appn 201810541607.9 with English Translation.

*Primary Examiner* — Chad M Dicke
(74) *Attorney, Agent, or Firm* — Banner & Witcoff, Ltd.

(57) ABSTRACT

An electronic pen and a tilt handwriting adjustment method thereof, a tilt handwriting adjustment system and an adjusting method thereof are provided. The electronic pen includes a pen body, a detector and a processor provided within the pen body. The detector is configured to detect a tilt angle of the pen body with respect to a writing plane, and output a corresponding detection parameter value; and the processor is configured to acquire the detection parameter value, and
(Continued)

generate and output a driving signal according to the detection parameter value, and a characteristic parameter value of the driving signal corresponds to the tilt angle.

10 Claims, 8 Drawing Sheets

(51) Int. Cl.
*G06F 3/038* (2013.01)
*G01B 7/30* (2006.01)

(56) References Cited

U.S. PATENT DOCUMENTS

| | | | |
|---|---|---|---|
| 2012/0182271 | A1 | 7/2012 | Wu et al. |
| 2016/0188016 | A1* | 6/2016 | Munakata ........... G06F 3/04162 345/179 |
| 2017/0192539 | A1 | 7/2017 | Fang et al. |
| 2018/0129306 | A1 | 5/2018 | Yeh et al. |
| 2018/0129307 | A1* | 5/2018 | Ju ........................ G01L 5/0038 |
| 2018/0143703 | A1* | 5/2018 | Fleck ................. G06F 3/03545 |

FOREIGN PATENT DOCUMENTS

| | | |
|---|---|---|
| CN | 103218065 A | 7/2013 |
| CN | 104345917 A | 2/2015 |
| CN | 105511648 A | 4/2016 |
| CN | 105912147 A | 8/2016 |
| CN | 107357472 A | 11/2017 |
| CN | 108762533 A | 11/2018 |
| TW | I598776 B | 9/2017 |

* cited by examiner

ELECTRONIC PEN AND INCLINED HANDWRITING ADJUSTMENT METHOD THEREOF, INCLINED HANDWRITING ADJUSTMENT SYSTEM, AND ADJUSTMENT METHOD THEREOF

This application is a U.S. National Phase Entry of International Application No. PCT/CN2019/089097 filed on May 29, 2019, designating the United States of America and claiming priority to Chinese Patent Application Nos. 201810541607.9 filed on May 30, 2018 and 201910229446.4 filed on Mar. 25, 2019. The present application claims priority to and the benefit of the above-identified applications and the above-identified applications are incorporated by reference herein in their entirety.

TECHNICAL FIELD

At least one embodiment of the present disclosure relates to an electronic pen and a tilt handwriting adjustment method thereof, a tilt handwriting adjustment system and an adjusting method thereof.

BACKGROUND

With development of science and technology, electronic devices should gradually be equipped in all aspects of people's lives, and going paperless becomes a trend. Touch operations may be performed on a touch panel by a finger, but because the finger is thick, it is difficult to write accurately and quickly on the small-sized touch panel with the finger. In addition, many types of application software, such as painting software, require high-precision touch operations to implement their functions. Therefore, a handwriting electronic pen based on the touch panel gradually develops, and the handwriting electronic pen may implement accurate touch operations on the touch panel. At present, the handwriting electronic pen can only implement touch and writing functions; and an experience of writing and drawing on the touch panel with the handwriting electronic pen is still far from that on real paper with a real pen.

SUMMARY

At least one embodiment of the present disclosure provides an electronic pen, including: a pen body; a detector and a processor provided within the pen body. The detector is configured to detect a tilt angle of the pen body with respect to a writing plane, and output a corresponding detection parameter value; and the processor is configured to acquire the detection parameter value, and generate and output a driving signal according to the detection parameter value, a characteristic parameter value of the driving signal corresponds to the tilt angle.

For example, in the electronic pen provided by an embodiment of the present disclosure, the detection parameter value includes a voltage parameter value; and the processor is configured to acquire the voltage parameter value, and generate and output the driving signal according to the voltage parameter value.

For example, in the electronic pen provided by an embodiment of the present disclosure, the detector includes a sliding resistance component, and the sliding resistance component includes a sliding resistor and a slider, a first end of the sliding resistor is configured to be electrically connected with a first power supply terminal, and a second end of the sliding resistor is configured to be electrically connected with a second power supply terminal; and the slider is configured to slide on the sliding resistor as the tilt angle of the pen body changes.

For example, in the electronic pen provided by an embodiment of the present disclosure, a cross-sectional shape of the sliding resistor that is cut by a plane parallel to a central axis of the pen body is an arc shape, the slider is coupled to the processor through a connecting rod, and a material of the connecting rod includes a conductive material, the first end of the sliding resistor is one end of the arc shape, and the second end of the sliding resistor is the other end of the arc shape.

For example, in the electronic pen provided by an embodiment of the present disclosure, a shape of the sliding resistor is a hollow hemispherical shell; a symmetry axis of the sliding resistor is a central axis of the pen body; the slider is coupled to the processor through a connecting rod; and a material of the connecting rod includes a conductive material, the first end of the sliding resistor is a vertex of the hollow hemispherical shell, and the second end of the sliding resistor is any point of an edge of the hollow hemispherical shell.

For example, in the electronic pen provided by an embodiment of the present disclosure, resistance between the first end of the sliding resistor and a contact point of the slider and the sliding resistor has a first resistance value, resistance between the second end of the sliding resistor and the contact point of the slider and the sliding resistor has a second resistance value, and a relationship among the tilt angle, the first resistance value and the second resistance value is: R11: R12=($\beta$−$\alpha$):$\alpha$. R11 represents the first resistance value, R12 represents the second resistance value, $\alpha$ represents the tilt angle, and $\beta$ represents a radian corresponding to an arc line between the first end of the sliding resistor and the second end of the sliding resistor.

For example, in the electronic pen provided by an embodiment of the present disclosure, the detector further includes a fixed-value resistor; the sliding resistor and the fixed-value resistor are arranged in series between the first power supply terminal and the second power supply terminal; and a relationship between the tilt angle and the voltage parameter value is:

$$V0 = \frac{(V1 - V2) \times \left(\frac{\alpha \cdot R1}{\beta} + R2\right)}{(R1 + R2)}.$$

V0 represents the voltage parameter value; V1 represents a first power supply voltage output from the first power supply terminal; V2 represents a second power supply voltage output from the second power supply terminal, the first power supply voltage and the second power supply voltage are different from each other; R1 represents a fixed resistance value of the sliding resistor, R1=R11+R12; and R2 represents a resistance value of the fixed-value resistor.

For example, in the electronic pen provided by an embodiment of the present disclosure, the detector includes a piezoelectric sheet and a pressure block; the pressure block is configured to apply a pressure corresponding to the tilt angle to the piezoelectric sheet according to the tilt angle; the piezoelectric sheet is configured to generate and output a pressure voltage value corresponding to the pressure; and the pressure voltage value is configured to generate the voltage parameter value.

For example, in the electronic pen provided by an embodiment of the present disclosure, a relationship between the tilt angle and the pressure is: $F=G\times \cos(\alpha)$. F represents the pressure, G represents gravity of the pressure block, and a represents the tilt angle; a relationship between the pressure and the voltage parameter value is: $V0=S\times F$. V0 represents the voltage parameter value, and S represents a piezoelectric coefficient of the piezoelectric sheet.

For example, in the electronic pen provided by an embodiment of the present disclosure, the piezoelectric sheet is provided within the pen body and is parallel to a central axis of the pen body; and the pressure block is provided on the piezoelectric sheet.

For example, in the electronic pen provided by an embodiment of the present disclosure, the detection parameter value includes a current parameter value; and the processor is configured to acquire the current parameter value, and generate and output the driving signal according to the current parameter value.

For example, in the electronic pen provided by an embodiment of the present disclosure, the detector includes a sliding resistance component and a fixed-value resistor; the sliding resistance component includes a sliding resistor and a slider; a first end of the sliding resistor is grounded, and a second end of the sliding resistor is grounded through the fixed-value resistor; the slider is coupled to the pen body through a connecting rod and is electrically connected with a first power supply terminal, the slider is configured to slide on the sliding resistor as the tilt angle of the pen body changes; and the current parameter value includes a value of a current flowing through the fixed-value resistor.

For example, in the electronic pen provided by an embodiment of the present disclosure, the characteristic parameter value of the driving signal includes at least one of a frequency value and an amplitude value of the driving signal.

For example, the electronic pen provided by an embodiment of the present disclosure further includes a transmitter provided within the pen body and connected with the processor. The transmitter is configured to boost the driving signal and transmit the driving signal which is boosted.

For example, the electronic pen provided by an embodiment of the present disclosure further includes a power-supply module. The power-supply module is provided within the pen body, and is configured to provide electric energy to the detector, the processor and the transmitter.

For example, in the electronic pen provided by an embodiment of the present disclosure, the pen body includes a base which is provided within the pen body, and the detector includes: a first electrode, movably sleeved within the pen body; a connecting rod, a first end of the connecting rod being movably coupled to an end face of the first electrode, a second end of the connecting rod being connected with a weight piece, the weight piece being configured to be in contact with the base under gravity thereof; a second electrode, fixedly provided within the pen body, located on a side of the first electrode away from the base, and configured to form a first capacitor with the first electrode; and a capacitance detecting portion, configured to detect capacitance of the first capacitor and generate capacitance information, the capacitance information is the detection parameter value, and the processor is configured to output tilt information of the electronic pen according to the capacitance information.

For example, in the electronic pen provided by an embodiment of the present disclosure, the first end of the connecting rod is movably coupled to the end face of the first electrode through a universal head; a side of the end face of the first electrode facing the universal head is provided with a hemispherical groove; the universal head includes a sphere body and a rod body connected with the sphere body; the sphere body is configured to match the hemispherical groove; and the rod body is connected with the connecting rod.

For example, in the electronic pen provided by an embodiment of the present disclosure, the pen body is provided with a first blocking portion and a second blocking portion along its axial direction; and the first blocking portion and the second blocking portion are located on two sides of the first electrode to limit a movable region of the first electrode.

For example, in the electronic pen provided by an embodiment of the present disclosure, a contact surface of the base contacting the weight piece is a concave surface.

For example, in the electronic pen provided by an embodiment of the present disclosure, the first electrode of the first capacitor is connected with a ground terminal, and the capacitance detecting portion includes: a first switching portion, connected with the second electrode of the first capacitor, a high-level signal terminal and a first clock signal terminal, and configured to transmit, in response to a signal of the first clock signal terminal, a signal of the high-level signal terminal to the second electrode of the first capacitor; a second switching portion, connected with the second electrode of the first capacitor, a second clock signal terminal and a first node, and configured to transmit, in response to a signal of the second clock signal terminal, a signal of the second electrode of the first capacitor to the first node; a second capacitor, provided between the first node and the ground terminal; a comparator, including an inverting input terminal and a non-inverting input terminal, the inverting input terminal receiving a reference voltage, and the non-inverting input terminal being connected with the first node; a latch, including a set terminal and a reset terminal, the set terminal being connected with an output terminal of the comparator, and the reset terminal being connected with a third clock signal terminal; a resistor, a first end of the resistor being coupled to the first node; a third switching portion, configured to be connected with a second end of the resistor, the ground terminal and an output terminal of the latch, and configured to transmit, in response to a signal of the output terminal of the latch, a signal of the second end of the resistor to the ground terminal; and a counter, configured to be connected with the output terminal of the latch, and configured to detect the number of times that the output terminal of the latch is at a high level. The processor is connected with the counter, and is configured to acquire the capacitance of the first capacitor according to the number of times that the output terminal of the latch is at a high level.

For example, in the electronic pen provided by an embodiment of the present disclosure, a line width of a handwriting scribed by the electronic pen is configured to be negatively correlated with the tilt angle.

An embodiment of the present disclosure further provides a tilt handwriting adjustment system, including a display panel, and the electronic pen as mentioned above. The display panel is configured to receive a driving signal, and adjust and display a handwriting according to the characteristic parameter value of the driving signal; and a line width of the handwriting corresponds to the tilt angle.

For example, in the tilt handwriting adjustment system provided by an embodiment of the present disclosure, the display panel is a touch display panel.

For example, in the tilt handwriting adjustment system provided by an embodiment of the present disclosure, the smaller the tilt angle is, the wider the line width of the handwriting is.

An embodiment of the present disclosure further provides a tilt handwriting adjustment method of the electronic pen, including: detecting the detection parameter value corresponding to the tilt angle of the pen body; generating the driving signal according to the detection parameter value, the characteristic parameter value of the driving signal corresponding to the tilt angle; and outputting the driving signal.

An embodiment of the present disclosure further provides an adjustment method of a tilt handwriting adjustment system, including: detecting the detection parameter value corresponding to the tilt angle of the pen body; generating the driving signal according to the detection parameter value, the characteristic parameter value of the driving signal corresponding to the tilt angle; outputting the driving signal; and receiving the driving signal by the display panel, and adjusting and displaying the handwriting according to the characteristic parameter value of the driving signal.

BRIEF DESCRIPTION OF THE DRAWINGS

In order to clearly illustrate the technical solution of embodiments of the present disclosure, the drawings of the embodiments or related technical description will be briefly described in the following; it is obvious that the drawings in the description are only related to some embodiments of the present disclosure and not limited to the present disclosure.

DETAILED DESCRIPTION

Figure 1:
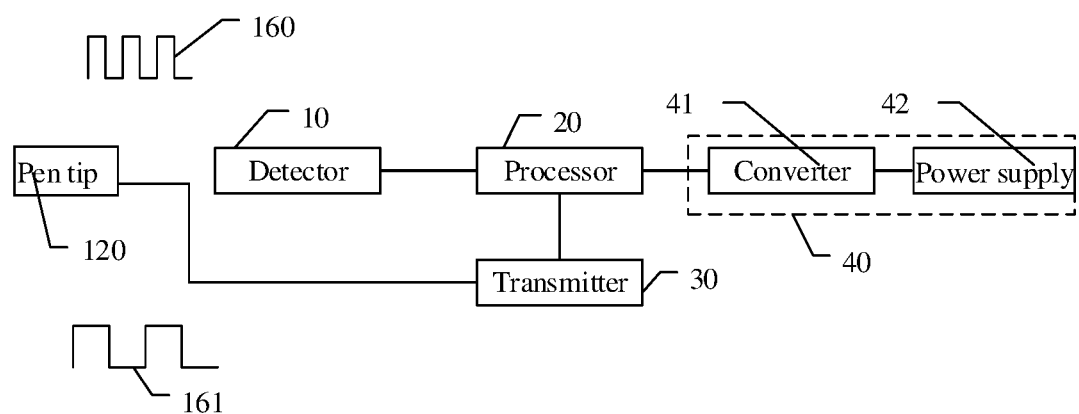
FIG. 1 is a schematic block diagram of an electronic pen provided by an embodiment of the present disclosure.

In order to make objects, technical details and advantages of the embodiments of the present disclosure apparently, the technical solutions of the embodiments will be described in a clearly and fully understandable way in connection with the drawings related to the embodiments of the present disclosure. It is obvious that the described embodiments are just a part but not all of the embodiments of the present disclosure. Based on the described embodiments herein, a person having ordinary skill in the art may obtain other embodiment(s), without any inventive work, which should be within the scope of the disclosure.

Unless otherwise defined, the technical terms or scientific terms used herein have the same meanings as commonly understood by one of ordinary skill in the art to which the present disclosure belongs. The terms "first", "second", etc., which are used in the description and the claims of the present disclosure, are not intended to characterize any sequence, amount or importance, but distinguish various components. The terms "includes", "including", "comprise", "comprising" etc., are intended to specify that the elements or the objects stated before these terms encompass the elements or the objects and equivalents thereof listed after these terms, but do not preclude the other elements or objects. The terms "connected" or "connected" are not limited to physical or mechanical connections, but may include electrical connections, whether direct or indirect. "On", "under", "right", "left" and the like are only used to indicate relative position relationship, and when the position of the object which is described is changed, the relative position relationship may be changed accordingly.

In order to keep the following description of the embodiments of the present disclosure clear and concise, the present disclosure omits detailed description of known functions and known components.

An electronic pen is a human-computer interaction tool, and a user may use the electronic pen to input instructions to an electronic device with a touch screen such as a computer, a mobile phone and a drawing board, for example, the user may use the electronic pen to perform operations such as writing and drawing on the electronic device. At present, the electronic pen mainly includes an active capacitive pen and a passive capacitive pen. A pen tip of the passive capacitive pen is made of a conductive material; on a principle similar to that of finger touch, the pen tip may form coupling capacitance with a touch electrode in a touch panel; and in a case where the pen tip contacts the touch panel, a touch chip may detect a change in the coupling capacitance between the pen tip and the touch electrode, so as to implement a touch function. A pen tip of the active capacitive pen may transmit a signal, and the touch panel receives the signal, so as to detect coordinates of the pen tip of the active capacitive pen, etc., so as to implement the touch function.

Embodiments of the present disclosure provide an electronic pen and a tilt handwriting adjustment method thereof, a tilt handwriting adjustment system and an adjustment method thereof; a thickness of a handwriting may be changed with a tilt angle between the electronic pen and a touch screen, thereby implementing tilt handwriting adjustment of the electronic pen and providing a more realistic writing and drawing experience, which facilitates operations such as calligraphy and painting; in addition, the electronic pen has a simple structure and a low cost.

Hereinafter, the embodiments of the present disclosure will be described in detail below, but the present disclosure is not limited to these embodiments.

Figure 2:
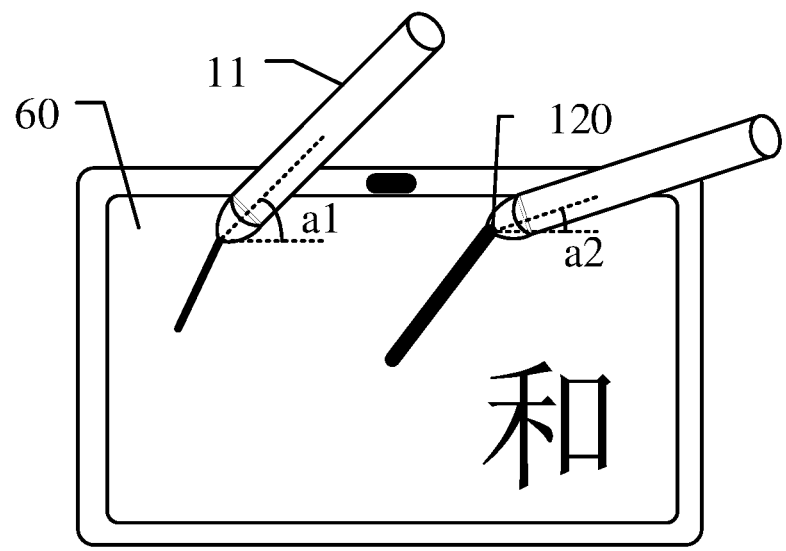
FIG. 2 is a schematic diagram of a handwriting changing with a tilt angle of an electronic pen provided by an embodiment of the present disclosure.

FIG. 1 is a schematic block diagram of an electronic pen provided by an embodiment of the present disclosure; and FIG. 2 is a schematic diagram of a line width of a handwriting changing with a tilt angle of an electronic pen provided by an embodiment of the present disclosure.

For example, as shown in FIG. 1 and FIG. 2, the electronic pen provided by the embodiment of the present disclosure includes: a pen body 11, a detector 10 and a processor 20. The detector 10 and the processor 20 are both provided within the pen body 11.

For example, the detector 10 is configured to detect a tilt angle of the pen body 11 with respect to a writing surface (for example, a touch surface of a touch panel 60), and output a corresponding detection parameter value. The processor 20 is configured to acquire the detection parameter value, and generate and output a driving signal according to the detection parameter value, and a characteristic parameter value of the driving signal corresponds to the tilt angle of the pen body 11.

It should be noted that, "the tilt angle of the pen body 11" represents: an included angle between the touch surface of the touch panel and, for example, a central axis of the pen body 11. For example, in a case where the touch panel is substantially in a horizontal state, that is, when the touch surface of the touch panel is parallel to a horizontal direction, the included angle between the touch surface and the central axis of the pen body 11 is the tilt angle of the pen body 11.

For example, the electronic pen may be an active capacitive pen.

For example, as shown in FIG. 1, the electronic pen further includes a pen tip 120, and the pen tip 120 is provided at one end of the pen body 11. The pen tip 120 is made of a conductive material (for example, indium tin oxide, etc.).

For example, the larger the tilt angle of the pen body 11, the smaller the line width of the handwriting, that is, the thinner the handwriting. That is to say, the line width of the handwriting is configured to be negatively correlated to the tilt angle. The above-described change in the line width is a change in a shape of the handwriting, and the shape of the handwriting may be changed by changing the tilt angle. As shown in FIG. 1 and FIG. 2, in a case where the tilt angle of the pen body 11 is a first angle a1, that is, when the included angle between the pen body 11 and the touch surface of the touch panel 60 is the first angle a1, the detector 10 may generate a first detection parameter value corresponding to the first angle a1, and the processor 20 may generate and output a first driving signal 160 according to the first detection parameter value; in a case where the tilt angle of the pen body 11 is a second angle a2, that is, when the included angle between the pen body 11 and the touch surface of the touch panel 60 is the second angle a2, the detector 10 may generate a second detection parameter value corresponding to the second angle a2, and the processor 20 may generate and output a second driving signal 161 according to the second detection parameter value. For example, the first angle a1 is larger than the second angle a2, and thus, as shown in FIG. 2, a handwriting when the tilt angle of the pen body 11 is the first angle a1 is thinner than a handwriting when the tilt angle of the pen body 11 is the second angle a2.

For example, the characteristic parameter value of the driving signal includes at least one of a frequency value and an amplitude value of the driving signal. For example, in some examples, the larger the tilt angle of the pen body 11 is, the larger the frequency value of the driving signal is, and/or, the larger the amplitude value of the driving signal is. For example, as shown in FIG. 2, characteristic parameter values of the first driving signal 160 and the second driving signal 161 are different from each other; and because the first angle a1 is larger than the second angle a2, a frequency value of the first driving signal 160 is larger than a frequency value of the second driving signal 161.

It should be noted that, the larger the tilt angle of the pen body 11 is, the smaller the frequency value of the driving signal may be, and/or, the smaller the amplitude value of the driving signal may be. A corresponding relationship between the tilt angle of the pen body 11 and the characteristic parameter value of the driving signal may be set according to actual situations, which will not be limited in the present disclosure.

For example, the processor 20 may include a microcontroller unit (MCU), etc.

For example, in some examples, the detection parameter value may include a voltage parameter value. The processor 20 is configured to acquire the voltage parameter value, and generate and output the driving signal according to the voltage parameter value. For example, the detector 10 may include a voltage detecting circuit, and the voltage detecting circuit may be configured to detect the voltage parameter value.

Figure 3:
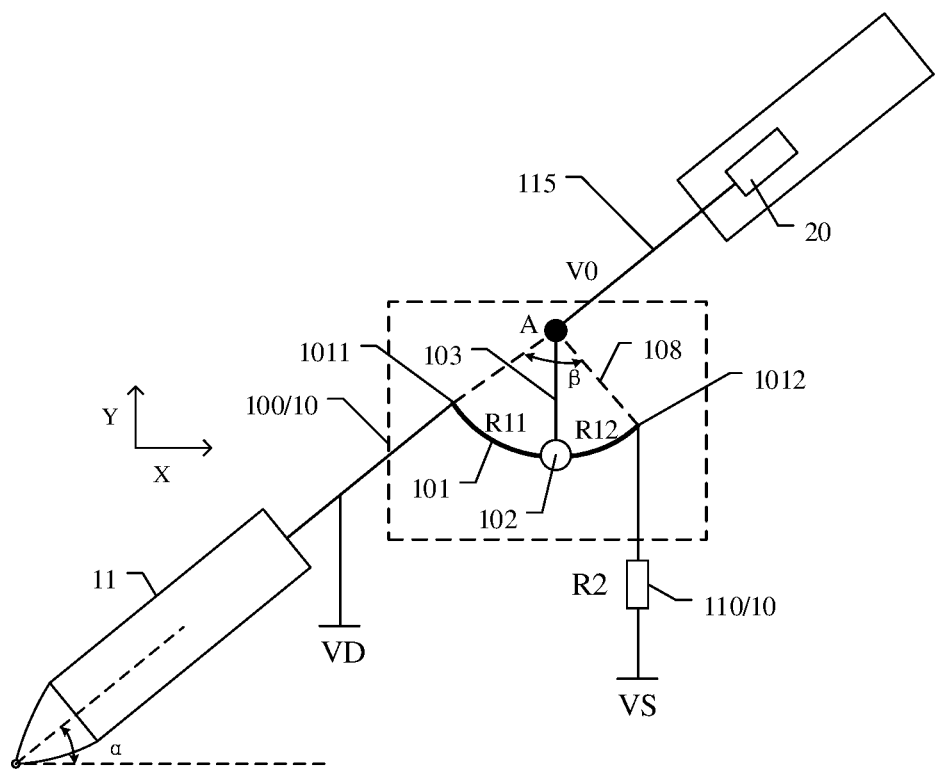
FIG. 3 is a structural schematic diagram of an electronic pen provided by an embodiment of the present disclosure.

FIG. 3 is a structural schematic diagram of an electronic pen provided by an embodiment of the present disclosure. For example, as shown in FIG. 3, the detector 10 may include a sliding resistance component 100, and the sliding resistance component 100 includes a sliding resistor 101 and a slider 102. A first end 1011 of the sliding resistor 101 is electrically connected with a first power supply terminal VD, and a second end 1012 of the sliding resistor 101 is electrically connected with a second power supply terminal VS. The slider 102 is configured to slide on the sliding resistor 101 as a tilt angle of a pen body 11 changes. The first power supply terminal VD and the second power supply terminal VS as described above may be located inside the pen body or outside the pen body, which will not be limited in the embodiment of the present disclosure.

For example, as shown in FIG. 3, a cross-sectional shape of the sliding resistor 101 may be an arc shape, for example, a circular arc shape. A cross-sectional shape of the sliding resistor 101 that is cut by an XY plane is an arc shape, and the sliding resistor 101 has a certain thickness in a direction perpendicular to the XY plane. In a case where the cross-sectional shape of the sliding resistor 101 is an arc shape, the first end 1011 of the sliding resistor 101 is one endpoint of the arc shape, and the second end 1012 of the sliding resistor 101 is the other endpoint of the arc shape.

For example, as shown in FIG. 3, in one example of this embodiment, the sliding resistor 101 having an arc-shaped cross section may be an arc-shaped conductive strip; and a relative positional relationship between the second end 1012 of the arc-shaped conductive strip and a pen tip 120 remains unchanged, while a connecting rod 103 or the slider 102 remains in contact with the arc-shaped conductive strip. Upon using the electronic pen, the user should try to ensure that the sliding resistor 101 and the slider 102 are located on a side of a central axis 11 of the pen body 11 that is close to a writing plane, and thus, when the tilt angle of the electronic pen is changed, the relative positional relationship between the slider and the sliding resistor may change to generate a change in an output signal frequency, so as to implement a line scribing function by tilting in a single direction.

For example, in another example of this embodiment, the sliding resistor 101 having an arc-shaped cross section may be an arc-shaped conductive strip, and a relative positional relationship between the second end 1012 of the arc-shaped conductive strip and the pen tip 120 is variable, while the connecting rod 103 or the slider 102 remains in contact with the arc-shaped conductive strip. The above-described expression that "a relative positional relationship between the second end 1012 of the arc-shaped conductive strip and the pen tip 120 is variable" refers to that in a rotating process of the pen body 11 about its central axis 115, the sliding resistor 101 and the slider 102 may always stay on the side of the central axis 115 of the pen body 11 that is close to the writing plane due to gravity, and thus, when the tilt angle of the electronic pen changes, the relative positional relationship between the slider and the sliding resistor may change to generate a change in the output signal frequency, so as to implement a line scribing function by tilting in various directions.

For example, the slider 102 is coupled to the processor 20 through the connecting rod 103, and may slide linearly on the arc-shaped sliding resistor 101. A material of the connecting rod 103 includes a conductive material. For example, one end of the connecting rod 103 is coupled to (for example, fixed to) a node A of the central axis 115 of the pen body 11, and the other end of the connecting rod 103 is connected with the slider 102. The connecting rod 103 and the slider 102 form a pendulum shape, and the connecting rod 103 may drive the slider 102 to swing left and right about the node A.

For example, a voltage parameter value includes a voltage value at the slider 102. As shown in FIG. 3, the processor 20 is configured to acquire the voltage value at the node A; and assuming that resistance of the connecting rod 103 is ignored, the voltage value at the node A is just the voltage value at the slider 102, that is, a voltage parameter value V0 includes the voltage value at the node A.

For example, as shown in FIG. 3, an extension line of the connecting rod 103 is perpendicular to a touch surface of a touch panel; and assuming that the touch surface of the touch panel is parallel to a horizontal direction, then the connecting rod 103 is parallel to a vertical direction. The horizontal direction is a direction parallel to the touch surface, and the vertical direction is a direction perpendicular to the touch surface. A connection line 108 between the second end 1012 of the sliding resistor 101 and the node A is mutually perpendicular to the central axis 115 of the pen body 11, so that an included angle between the connecting rod 103 and the connection line 108 is equal to the tilt angle of the pen body 11.

For example, a shape of the sliding resistor 101 is a circular arc shape, and the first end 1011 of the sliding resistor 101 may be located on the central axis 115 of the pen body 11, so that the shape of the sliding resistor 101 is a quarter arc shape.

For example, a shape of the slider 102 may be a circular ring or the like. The sliding resistor 101 may pass through the slider 102 having a circular ring shape, so as to ensure that the slider 102 is always in contact with the sliding resistor 101 during a sliding process.

For example, as shown in FIG. 3, in a case where the shape of the sliding resistor 101 is an arc shape, a length of the connecting rod 103 is fixed and equal to a radius of the arc shape. However, the embodiment is not limited thereto, and the connecting rod 103 may also have flexibility, for example, the connecting rod 103 may be a spring to adapt to various shapes of sliding resistors 101. Assuming that distances from respective points on the sliding resistor 101 to the node A are different from one another, the length of the connecting rod 103 may change according to different positions of the slider 102 on the sliding resistor 101.

For example, the slider 102 and the connecting rod 103 are both made of a conductive material.

For example, a voltage output from the first power supply terminal VD and a voltage output from the second power supply terminal VS are not equal to each other. One of the first power supply terminal VD and the second power supply terminal VS is a high-voltage terminal, and the other is a low-voltage terminal. For example, in the embodiment shown in FIG. 3, the first power supply terminal VD is a voltage source to output a constant positive voltage; and the second power supply terminal VS may be a voltage source to output a constant negative voltage, or the second power supply terminal VS may also be grounded.

For example, as shown in FIG. 3, the detector 10 further includes a fixed-value resistor 110, and the second end 1012 of the sliding resistor 101 is connected with the second power supply terminal VS through the fixed-value resistor 110. The fixed-value resistor 110 may prevent a voltage detection error. Assuming that the second power supply terminal VS is grounded, upon the slider 102 sliding to the second end 1012 of the sliding resistor 101, the voltage value at the node A is voltage drop across the fixed-value resistor 110, which avoids the voltage value at the node A being 0, to prevent a detection error.

For example, the sliding resistor 101 and the fixed-value resistor 110 are arranged in series between the first power supply terminal VD and the second power supply terminal VS. For example, in the example shown in FIG. 3, the detector 10 includes a fixed-value resistor 110, and the fixed-value resistor 110 may be provided between the sliding resistor 101 and the second power supply terminal VS. The detector 10 also includes two fixed-value resistors 110: one of the two fixed-value resistors 110 is provided between the sliding resistor 101 and the first power supply terminal VD, and the other of the two fixed-value resistors 110 is provided between the sliding resistor 101 and the second power supply terminal VS.

It should be noted that, resistance values of the sliding resistor 101 and the fixed-value resistor 110 may be specifically set according to actual situations, which will not be limited in the present disclosure.

For example, resistance between the first end 1011 of the sliding resistor 101 and a contact point of the slider 102 and the sliding resistor 101 is a first resistance value; and resistance between the second end 1012 of the sliding resistor 101 and the contact point of the slider 102 and the sliding resistor 101 is a second resistance value. In a case where the tilt angle of the pen body 11 changes, the first resistance value and the second resistance value will change accordingly, and a sum of the first resistance value and the second resistance value is a fixed resistance value of the sliding resistor 101.

For example, as shown in FIG. 3, in a case where the tilt angle of the pen body 11 is a, the first resistance value is R11, the second resistance value is R12, and a relationship among the tilt angle α, the first resistance value R11 and the second resistance value R12 is expressed as:

$$R11:R12=(\beta-\alpha):\alpha.$$

β represents a radian corresponding to an arc shape between the first end 1011 of the sliding resistor 101 and the second end 1012 of the sliding resistor 101.

Therefore, as shown in FIG. 3, a relationship between the tilt angle and the voltage parameter value is expressed as a formula below:

$$V0 = \frac{(V1-V2) \times (R12 + R2)}{(R11 + R12 + R2)} = \frac{(V1-V2) \times \left(\frac{\alpha \cdot R1}{\beta} + R2\right)}{(R1 + R2)}.$$

V0 represents the voltage parameter value (i.e., the voltage value at the node A); V1 represents a first power supply voltage output from the first power supply terminal VD, V2 represents a second power supply voltage output from the second power supply terminal VS, the first power supply voltage V1 and the second power supply voltage V2 are different from each other; R1 represents the fixed resistance value of the sliding resistor 101, R1=R11+R12; and R2 represents a resistance value of the fixed-value resistor 110. After the processor 20 obtains the voltage parameter value V0, the tilt angle α of the pen body 11 may be obtained by using the above-described formula of the tilt angle and the voltage parameter value.

For example, in a case where the shape of the sliding resistor 101 is a quarter arc shape, β is π/2, and the above-described relationship among the tilt angle α, the first resistance value R11 and the second resistance value R12 may be expressed as:

$$R11:R12 = \left(\frac{\pi}{2} - \alpha\right): \alpha.$$

The relationship between the tilt angle and the voltage parameter value is expressed as:

$$V0 = \frac{(V1-V2) \times \left(\frac{2 \cdot \alpha \cdot R1}{\pi} + R2\right)}{(R1 + R2)}.$$

For example, the processor 20 may acquire the voltage value at the node A, the voltage value at the node A is the voltage parameter value, and then the processor 20 may generate and output the driving signal according to the voltage parameter value. From the above-described formula of the tilt angle and the voltage parameter value, it can be known that the voltage parameter value V0 only changes with the tilt angle α of the pen body 11, and the tilt angle α is proportional to the voltage parameter value V0. For example, assuming that the tilt angle α of the pen body 11 is proportional to a frequency value of the driving signal, then the larger the voltage parameter value V0 acquired by the processor 20, the larger the frequency value of the driving signal generated and output by the processor 20.

For example, a corresponding relationship between the voltage parameter value and the characteristic parameter value of the driving signal may be specifically set. For example, the voltage parameter value may be divided into N voltage levels, and the frequency value of the driving signal may be divided into M frequency levels, where M and N are both positive integers. M and N may be equal to each other, so that the N voltage levels of the voltage parameter value and the M frequency levels of the frequency value of the driving signal are in one-to-one correspondence with each other. For example, in some examples, the voltage parameter value may be divided into a first voltage level, a second voltage level and a third voltage level; a voltage value range of the first voltage level is 0 V to 5 V, a voltage value range of the second voltage level is 5 V to 10 V, and a voltage value range of the third voltage level is 10 V to 15 V. Accordingly, the frequency value of the driving signal may also be divided into a first frequency level, a second frequency level and a third frequency level; a frequency value of the first frequency level is 300 KHz, a frequency value of the second frequency level is 400 KHz, and a frequency value of the third frequency level is 500 KHz. It should be noted that, M and N may also be unequal to each other.

Figure 4:
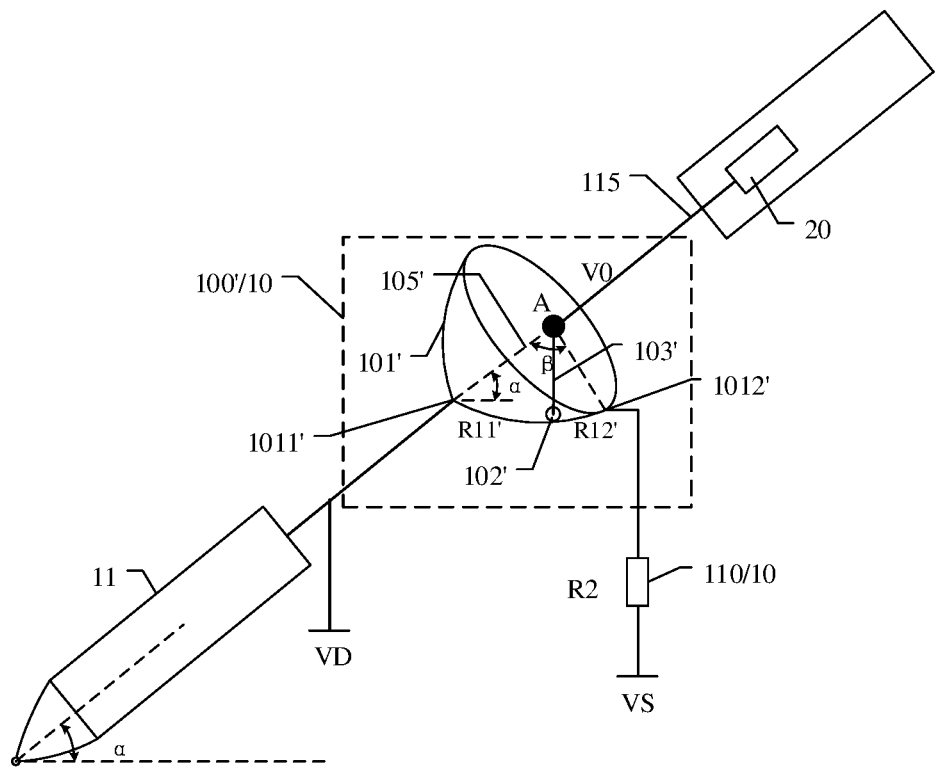
FIG. 4 is a structural schematic diagram of another electronic pen provided by an embodiment of the present disclosure.

FIG. 4 is a structural schematic diagram of another electronic pen provided by an embodiment of the present disclosure. For example, as shown in FIG. 4, a detector 10 may include a sliding resistance component 100', and the sliding resistance component 100' includes a sliding resistor 101' and a slider 102'. A shape of the sliding resistor 101' may be a hollow hemispherical shell; a symmetry axis 105' of the sliding resistor 101' may be a central axis 115 of a pen body 11; and the slider 102' is coupled to the pen body 11 through a connecting rod 103'. A first end 1011' of the sliding resistor 101' is a vertex of the hollow hemispherical shell, and a second end 1012' of the sliding resistor 101' is any point on an edge of the hollow hemispherical shell.

In an example shown in FIG. 4, in a case where the pen body 11 rotates about the central axis 115, the slider 102' may always slide inside the sliding resistor 101', that is to say, the slider 102' may slide on the sliding resistor 101' without being affected by rotation of the pen body 11, and a position of the slider 102' on the sliding resistor 101' corresponds to a tilt angle of the pen body 11.

For example, the slider 102' may be in sliding contact with an inner spherical surface of the hemispherical shell-shaped sliding resistor 101'. A cover plate (not shown) is provided on a hemispheric edge of the sliding resistor 101' to prevent the slider 102' from sliding out of the sliding resistor 101'. A surface of the cover plate is perpendicular to the central axis 115 of the pen body 11.

For example, one end of the connecting rod 103' is coupled to (for example, fixed to) a node A of the central axis 115 of the pen body 11. The node A may be a spherical center of the hemispherical shell-shaped sliding resistor 101'.

For example, a length of the connecting rod 103' may be equal to a radius of the inner spherical surface of the hemispherical shell. The connecting rod 103' is made of a conductive material.

It should be noted that, the symmetry axis 105' of the sliding resistor 101' may represent a connection line between the vertex of the hemispherical shell and the node A. The first end of the sliding resistor 101' may be the vertex of the hemispherical shell, and the second end of the sliding resistor 101' may be any point on a circular-ring end face of the hemispherical shell.

For example, a relationship between the tilt angle and a voltage parameter value in the example shown in FIG. 4 is the same as the relationship between the tilt angle and the voltage parameter value in the example shown in FIG. 3. As shown in FIG. 4, in a case where the tilt angle of the pen body 11 is a, resistance between the first end 1011' of the sliding resistor 101' and a contact point of the slider 102' and the sliding resistor 101' is a first resistance value, i.e., R11', resistance between the second end 1012' of the sliding resistor 101' and the contact point of the slider 102' and the sliding resistor 101' is a second resistance value, i.e., R12', and a relationship among the tilt angle α, the first resistance value R11' and the second resistance value R12' is expressed as:

$$R11':R12'=(<-\alpha):\alpha.$$

For example, β is π/2, so the relationship among the tilt angle α, the first resistance value R11' and the second resistance value R12' is expressed as:

$$R11':R12' = \left(\frac{\pi}{2} - \alpha\right): \alpha.$$

Therefore, a relationship between the tilt angle and the voltage parameter value is expressed as:

$$V0 = \frac{(V1-V2)\times(R12'+R2)}{(R11'+R12'+R2)} = \frac{(V1-V2)\times\left(\frac{2\cdot\alpha\cdot R1'}{\pi}+R2\right)}{(R1+R2)}.$$

V0 represents the voltage parameter value (i.e., a voltage value at the node A); V1 represents a first power supply voltage output from a first power supply terminal VD, V2 represents a second power supply voltage output from a second power supply terminal VS; R1' represents a fixed resistance value of the sliding resistor 101', R1'=R11'+R12'; and R2 represents a resistance value of a fixed-value resistor 110.

It should be noted that, for detailed description of corresponding relationships of the slider 102 ', the connecting rod 103', the fixed-value resistor 110 as well as the voltage parameter value and the characteristic parameter value of the driving signal, etc. related description in the above-described embodiment shown in FIG. 3 may be referred to, and no details will be repeated here.

Figure 5:
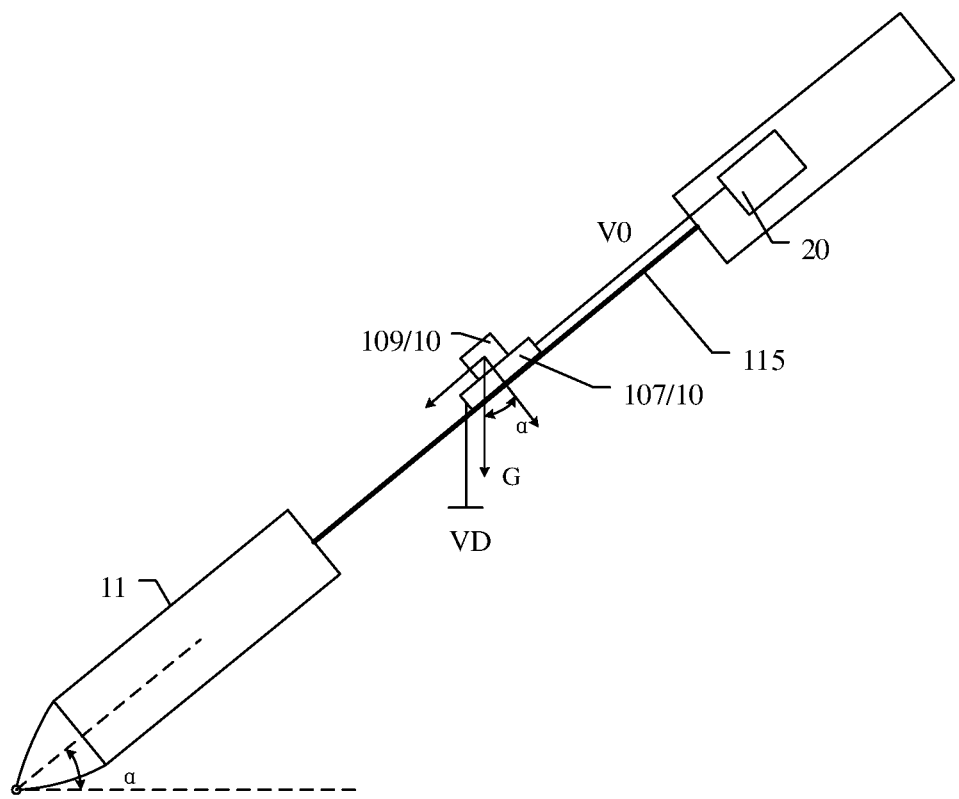
FIG. 5 is a structural schematic diagram of still another electronic pen provided by an embodiment of the present disclosure.

FIG. 5 is a structural schematic diagram of still another electronic pen provided by an embodiment of the present disclosure. For example, as shown in FIG. 5, a detector 10 includes a piezoelectric sheet 107 and a pressure block 109. The detector 10 may detect a tilt angle of a pen body 11 by gravity sensing.

For example, the pressure block 109 is configured to apply a pressure corresponding to a tilt angle α to the piezoelectric sheet 107 according to the tilt angle α. The piezoelectric sheet 107 is configured to generate and output a pressure voltage value corresponding to the pressure, and a voltage parameter value includes the pressure voltage value.

For example, the piezoelectric sheet 107 is provided in the pen body 11 and is parallel to a central axis 115 of the pen body 11. The piezoelectric sheet 107 may output different pressure voltage values according to different pressures applied thereto.

For example, the pressure block 109 may be provided on the piezoelectric sheet 107, for example, the pressure block 109 may be provided on a side of the piezoelectric sheet 107 that is away from the central axis 115.

For example, the piezoelectric sheet 107 may be made of a piezoelectric material. The piezoelectric material may include inorganic piezoelectric materials (e.g., piezoelectric crystals, piezoelectric ceramics, etc.), organic piezoelectric materials (e.g., polyvinylidene fluoride (PVDF), etc.), and so on.

For example, a relationship between the tilt angle and the pressure applied by the pressure block 109 on the piezoelectric sheet 107 may be expressed as:

$$F=G\times\cos(\alpha).$$

F represents the pressure applied by the pressure block 109 to the piezoelectric sheet 107, G represents gravity of the pressure block 109, and a represents the tilt angle.

For example, a relationship between the pressure and the voltage parameter value may be expressed as:

$$V0=S\times F=S\times G\times\cos(\alpha).$$

V0 represents the voltage parameter value, and S represents a piezoelectric coefficient of the piezoelectric sheet 107. It can be known from the above-described formula of the pressure F and the voltage parameter value V0 that the voltage parameter value V0 only changes with the tilt angle α, and the voltage parameter value V0 is inversely proportional to the tilt angle α.

It should be noted that, for detailed description of a corresponding relationship between the voltage parameter value V0 and the characteristic parameter value of the driving signal, etc., related description in the above-described embodiment shown in FIG. 3 may be referred to, and no details will be repeated here.

For example, in some examples, the detection parameter value includes a current parameter value; and the processor 20 is configured to acquire the current parameter value, and generate and output the driving signal according to the current parameter value. For example, the detector 10 may include a current detecting circuit, and the current detecting circuit is configured to detect the current parameter value.

Figure 6:
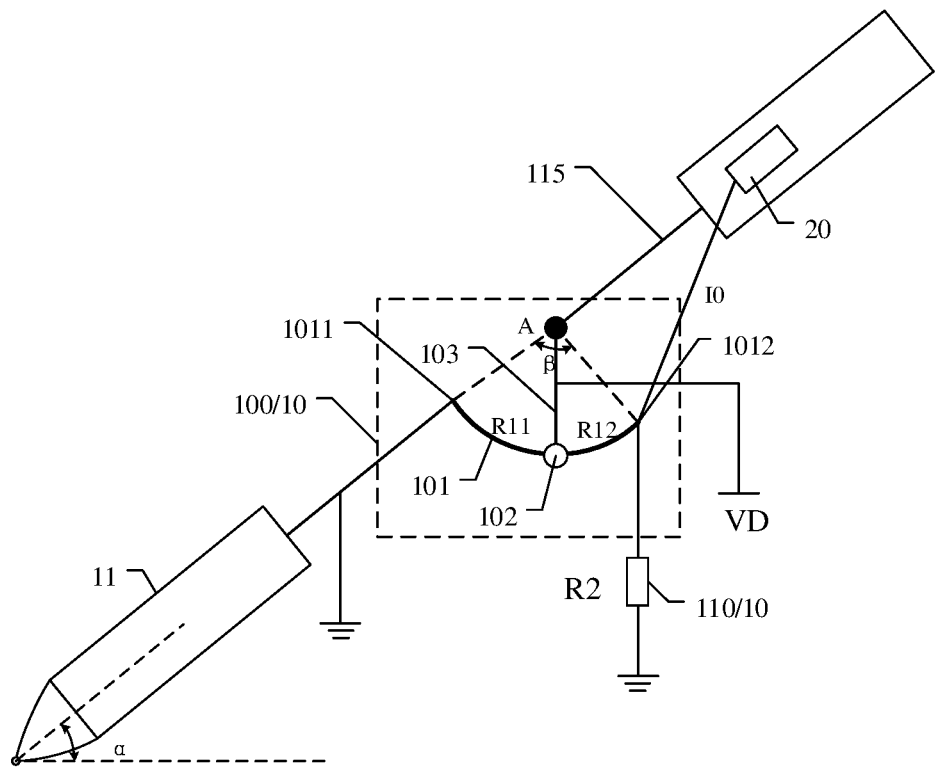
FIG. 6 is a structural schematic diagram of an electronic pen provided by another embodiment of the present disclosure.

FIG. 6 is a structural schematic diagram of an electronic pen provided by another embodiment of the present disclosure. For example, as shown in FIG. 6, a detector 10 includes a sliding resistance component 100 and a fixed-value resistor 110. The sliding resistance component 100 includes a sliding resistor 101 and a slider 102. A first end 1011 of the sliding resistor 101 is grounded, and a second end 1012 of the sliding resistor 101 is grounded through the fixed-value resistor 110. The slider 102 is coupled to the pen body 11 through a connecting rod 103 and is electrically connected with a first power supply terminal VD. The slider 102 is configured to slide on the sliding resistor 101 as a tilt angle of the pen body 11 changes.

For example, a current parameter value I0 includes a value of a current flowing through the fixed-value resistor 110. For example, as shown in FIG. 6, a processor 20 is configured to acquire a current value at the second end 1012 of the sliding resistor 101, the current value at the second end 1012 of the sliding resistor 101 is the value of the current flowing through the fixed-value resistor 110.

For example, the first end 1011 of the sliding resistor 101 may be connected with a second power supply terminal, and the second end 1012 of the sliding resistor 101 may also be connected with the second power supply terminal through the fixed-value resistor 110.

For example, as shown in FIG. 6, a shape of the sliding resistor 101 is an arc shape, that is, the sliding resistor 101 is the sliding resistor in the example shown in FIG. 3. In a case where the tilt angle of the pen body 11 is a, a first resistance value is R11, a second resistance value is R12, and a relationship among the tilt angle α, the first resistance value R11 and the second resistance value R12 is expressed as:

$$R11:R12=(\beta-\alpha):\alpha.$$

β is a radian corresponding to an arc shape between the first end 1011 of the sliding resistor 101 and the second end 1012 of the sliding resistor 101.

Therefore, a relationship between the tilt angle and the current parameter value is expressed as:

$$I0 = \frac{V1}{(R12 + R2)} = \frac{V1}{\left(\frac{\alpha \cdot R1}{\beta} + R2\right)}.$$

I0 represents the current parameter value (i.e., the current value at the second end 1012 of the sliding resistor 101); V1 represents a first power supply voltage output from the first power supply terminal VD; R1 represents a fixed resistance value of the sliding resistor 101; and R2 represents resistance of a fixed-value resistor 110. In a case that the processor 20 obtains the current parameter value I0, the tilt angle α of the pen body 11 may be obtained by using the above-described formula of the tilt angle and the current parameter value I0.

For example, when the shape of the sliding resistor 101 is a quarter arc shape, β is π/2, so the above-described relationship of the resistance values may be expressed as:

$$R11 : R12 = \left(\frac{\pi}{2} - \alpha\right) : \alpha.$$

The relationship between the tilt angle α and the current parameter value I0 is expressed as:

$$I0 = \frac{V1}{(R12 + R2)} = \frac{V1}{\left(\frac{2 \cdot \alpha \cdot R1}{\pi} + R2\right)}.$$

For example, the processor 20 may acquire the current parameter value (i.e., the current value at the second end 1012 of the sliding resistor 101), and then the processor 20 may generate and output the driving signal according to the current parameter value. It can be known from the above-described formula of the tilt angle α and the current parameter value I0 that the current parameter value I0 only changes with the tilt angle α, and the current parameter value I0 is inversely proportional to the tilt angle α. For example, assuming that the tilt angle of the pen body 11 is proportional to a frequency value of the driving signal, then the larger the current parameter value I0 acquired by the processor 20, the smaller the frequency value of the driving signal generated and output by the processor 20.

It should be noted that, the shape of the sliding resistor 101 may also be a hollow hemispherical shell, that is, the sliding resistor 101 may also be the sliding resistor in the example shown in FIG. 4.

Figure 7A:
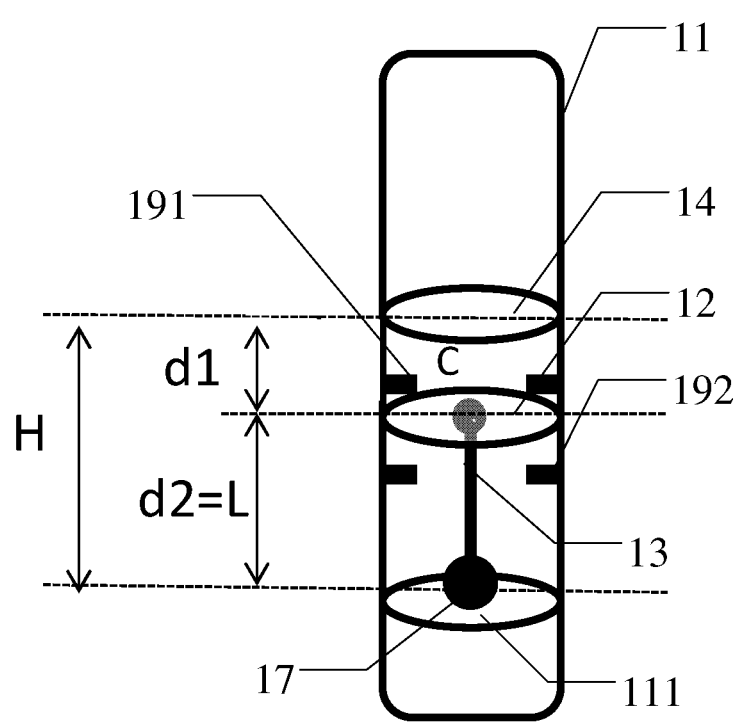
FIG. 7A to FIG. 7B are structural schematic diagrams of an electronic pen provided by another embodiment of the present disclosure.
Figure 7B:
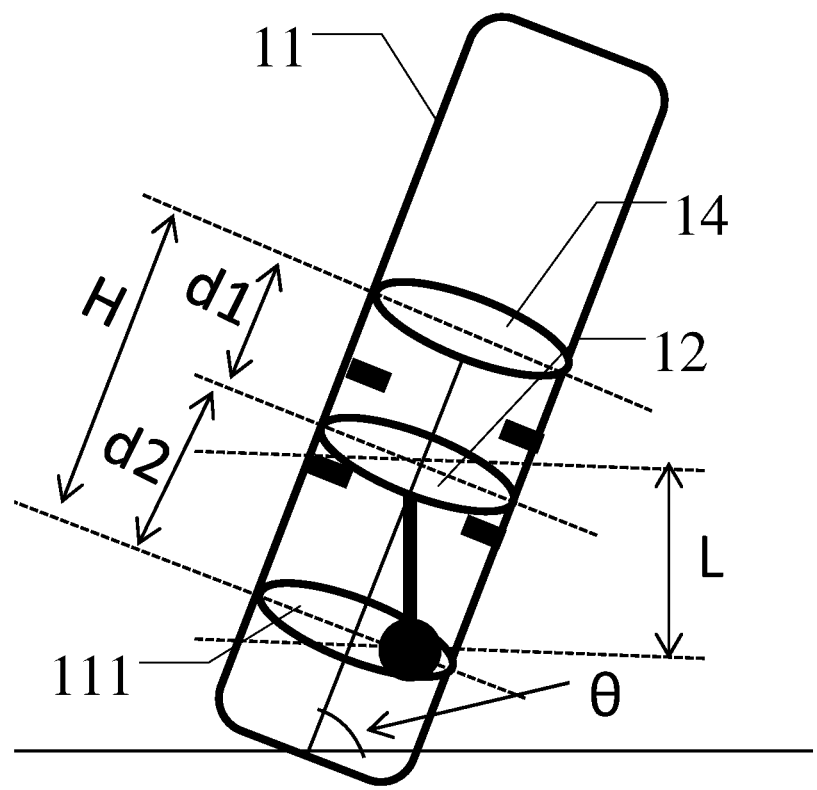
Figure 7C:
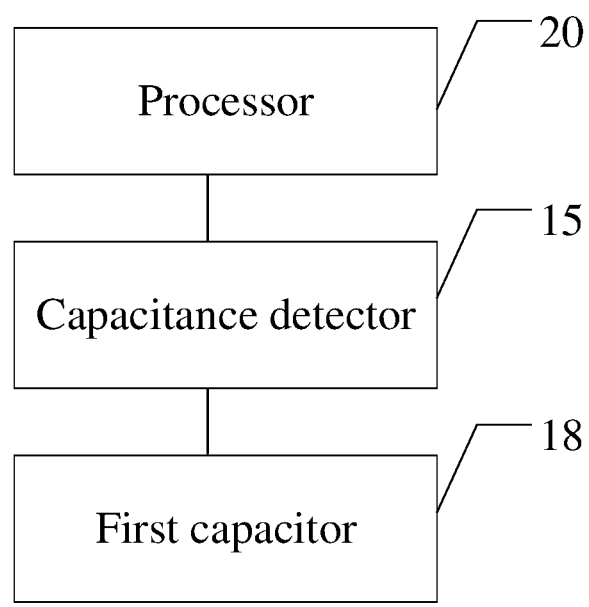
FIG. 7C is a functional block diagram of a detector in the electronic pen shown in FIG. 7A.

Another embodiment of the present disclosure provides an electronic pen. As shown in FIG. 7A to FIG. 7C, FIG. 7A is a structural schematic diagram of a detector in the electronic pen according to this embodiment in a vertical state, FIG. 7B is a structural schematic diagram of the detector in the electronic pen according to this embodiment in a tilt state, and FIG. 7C is a functional block diagram of the detector in the electronic pen. The detector may include: a first electrode 12, a connecting rod 13, a second electrode 14 and a capacitance detector 15. A base 111 is provided within a cavity of a pen body 11 that extends in an axial direction. The first electrode 12 is movably sleeved within the cavity. The connecting rod 13 has a first end movably coupled to an end face of the first electrode 12, and a second end connected with a weight piece 17; and the weight piece 17 is configured to be in contact with the base 111 under gravity thereof. The second electrode 14 is fixedly provided within the cavity, is located on a side of the first electrode 12 that is away from the base 111, and is configured to form a first capacitor 18 with the first electrode 12; the capacitance detector 15 is configured to detect capacitance of the first capacitor 18 and generate capacitance information; and a processor 20 is configured to output tilt information of the electronic pen according to the capacitance information. In a case where the electronic pen tilts, the first electrode moves under an action of the weight piece 17, so that different capacitance is generated between the first electrode and the second electrode; and a tilt state of the electronic pen may be calculated according to actual capacitance of the first capacitor.

In this exemplary embodiment, as shown in FIG. 7A and FIG. 7B, capacitance C of the first capacitor satisfies $C = \varepsilon \cdot S / d_1$ (1). The above-described ε is a dielectric constant, S is a relative area between the first electrode and the second electrode, and $d_1$ is a relative distance between the first electrode and the second electrode. A positional relationship among the first electrode, the second electrode and the base satisfies $d_1 = H - d_2$ (2), where $d_2$ is a relative distance between the first electrode and the base, and H is a relative distance between the second electrode and the base. A distance between the first electrode and the base, and a length of the connecting rod satisfy $d_2 = L \cdot \sin \theta$ (3), where the above-described L is a length of the connecting rod, and θ reflects an angle of the tilt state. According to the above-described formulas (1), (2) and (3), $\theta = \sin^{-1} L \cdot C$ may be obtained. $d_2$ may be obtained by a position sensor. The processor 20 may obtain the θ angle representing the tilt state of the electronic pen by using the above-described calculation method. For example, the processor 20 may form the above-described algorithm by software programming, or may also form the above-described algorithm by hardware.

Figure 7D:
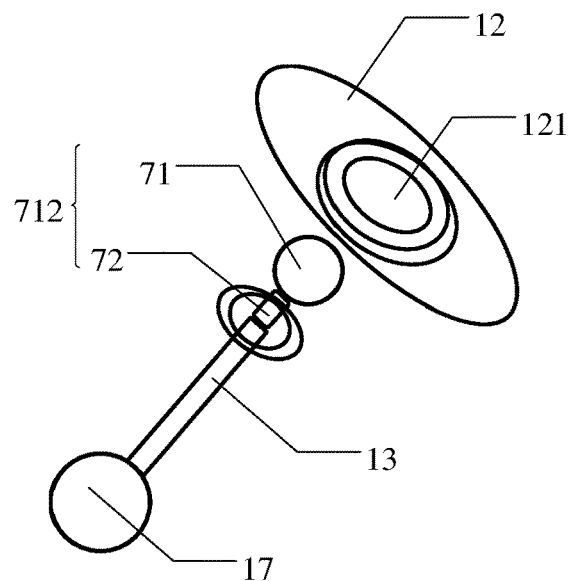
FIG. 7D is a structural schematic diagram of a universal head in the electronic pen shown in FIG. 7A.

FIG. 7D is a structural schematic diagram of a universal head in the electronic pen. As shown in FIG. 7D, the first end of the connecting rod 13 is movably coupled to the end face of the first electrode 12 through the universal head 712. One end face of the first electrode 12 may be provided with a hemispherical groove 121; the universal head 712 may include a sphere body 71 and a rod body 72; the sphere body 71 is configured to match the hemispherical groove 121; and the rod body 72 is connected with the connecting rod 13. It should be noted that, the universal head may also have more structures to choose from, which all belong to the protection scope of the present disclosure.

For example, as shown in FIG. 7A, the cavity may be provided with a first blocking portion 191 and a second blocking portion 192 along its axial direction; and the first blocking portion 191 and the second blocking portion 192 are located on both sides of the first electrode 12 along a central axis of the pen body 11. For example, the first blocking portion 191 and the second blocking portion 192 may be annular bosses within the cavity of the pen body 11; and the first blocking portion 191 and the second blocking portion 192 may limit the first electrode 12 in a space between the first blocking portion 191 and the second blocking portion 192.

Figure 7E:
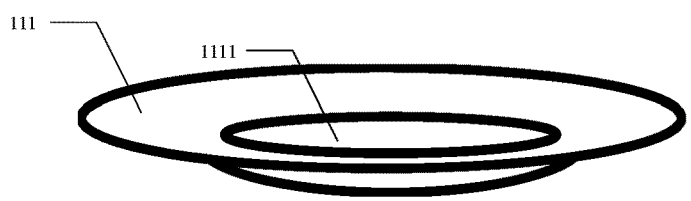
FIG. 7E is a structural schematic diagram of a base in the electronic pen shown in FIG. 7A.

For example, FIG. 7E is a structural schematic diagram of the base in the electronic pen. As shown in FIG. 7E, a contact surface of the base 111 between the base 111 and the weight piece may be a concave surface 1111 that is recessed toward a centroid of the base 111. The setting may facilitate the weight piece to return to the centroid position of the base when the electronic pen is placed upright. For example, the weight piece may be a sphere body, and a friction force between the weight piece having the sphere body shape and the base is relatively small, which facilitates the weight piece to slide on the base in a direction of gravity.

Figure 7F:
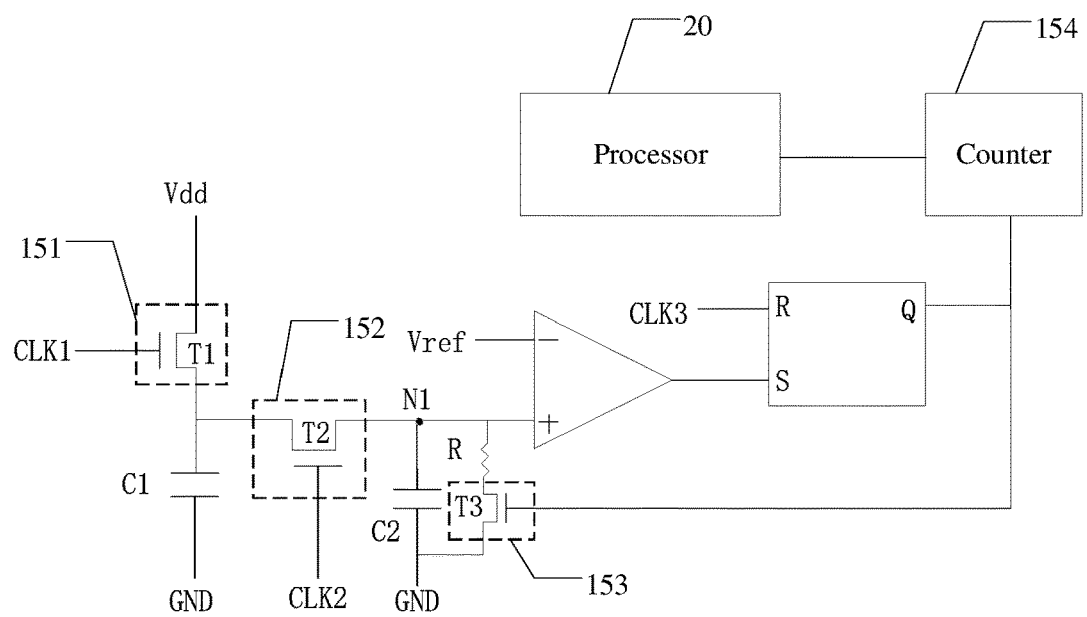
FIG. 7F is a circuit structural diagram of a capacitance detector in the electronic pen shown in FIG. 7A.

FIG. 7F is a circuit structural diagram of the capacitance detector in the electronic pen. As shown in FIG. 7F, the first electrode of the first capacitor C1 is connected with a ground terminal GND; and the capacitance detector may include: a first switching device 151, a second switching device 152, a second capacitor C2, a comparator CMP, a latch Latch, a resistor R, a third switching device 153 and a counter 154. The first switching device 151 is connected with a second electrode of the first capacitor C1, a high-level signal terminal Vdd and a first clock signal terminal CLK1, and is configured to transmit, in response to a signal of the first clock signal terminal CLK1, a signal of the high-level signal terminal Vdd to the second electrode of the first capacitor C1; the second switching device 152 is connected with the second electrode of the first capacitor C1, a second clock signal terminal CLK2 and a first node N1, and is configured to transmit, in response to a signal of the second clock signal terminal CLK2, a signal of the second electrode of the first capacitor C1 to the first node N1; the second capacitor C2 is provided between the first node N1 and the ground terminal GND; an inverting input terminal of the comparator CMP receives a reference voltage Vref, and a non-inverting input terminal thereof is connected with the first node N1; a set terminal S of the latch Latch is connected with an output terminal of the comparator CMP, a reset terminal R thereof is connected with a third clock signal terminal CLK3; a first end of the resistor R is connected with the first node N1; the third switching device 153 is connected with a second end of the resistor R, the ground terminal GND, and an output terminal Q of the latch Latch, and is configured to transmit, in response to a signal of the output terminal Q of the latch Latch, a signal of the second end of the resistor R to the ground terminal GND; and the counter 154 is connected with the output terminal Q of the latch Latch, and is configured to detect the number of times that the output terminal of the latch Latch is at a high level. The processor 20 is connected with the counter 154, and is configured to acquire the capacitance of the first capacitor in combination with the number of times that the output terminal of the latch is at a high level. For example, the first switching device 151 may be an N-type transistor T1, the second switching device 152 may be an N-type transistor T2, and the third switching device 153 may be an N-type transistor T3.

Figure 7G:
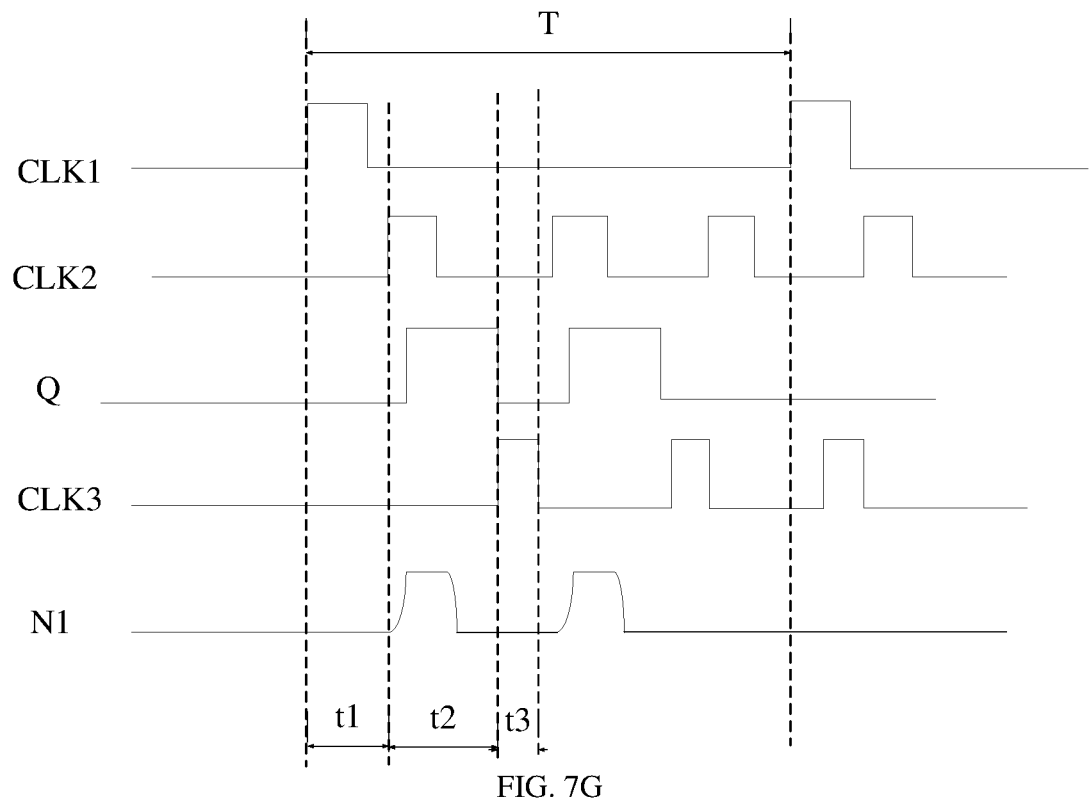
FIG. 7G is a timing diagram of respective nodes of the capacitance detector in the electronic pen shown in FIG. 7A.

FIG. 7G is a timing diagram of respective nodes of the capacitance detector in the electronic pen. As shown in FIG. 7G, T represents a capacitance detection period; at a beginning period t1 of the capacitance detection period T, the first clock signal terminal CLK1 is at a high level, the second clock signal terminal CLK2 is at a low level, and the high-level signal terminal Vdd charges the first capacitor C1 through the first N-type transistor T1. In a time period t2, the first clock signal terminal CLK1 is at a low level, the second clock signal terminal is at a high level, the second N-type transistor T2 is turned on, and the first capacitor C1 charges the second capacitor C2. When a voltage of the first node reaches the reference voltage Vref, the output terminal of the comparator outputs a high-level signal. At this time, the reset terminal R of the latch is at a low level, the output terminal Q of the latch outputs a high-level signal, and the third N-type transistor T3 is turned on, to guide electric power on the second capacitor C2 to the ground terminal. In a time period t3, the third clock signal terminal CLK3 is at a high level, to set the output terminal Q of the latch to a low level for a next cycle. As shown in FIG. 7G, the second capacitor C2 undergoes two charging and discharging processes, and the responding output terminal Q of the latch presents the same number of high level pulses. Therefore, the number of charging times n of the second capacitor C2 may be obtained by counting the number of high level pulses at the output terminal Q of the latch. Electric charge of the second capacitor C2 charged once is $C2*Vref$, then electric charge of the second capacitor C2 charged within a detection period satisfies $Q=n*C2*Vref=C1*Vdd$, where the above-described C1 is the capacitance of the first capacitor C1, and C2 is the capacitance of the second capacitor, and thus, the capacitance of the first capacitor C1 satisfies $C1=n*C2*Vref/Vdd$. The number of charging times n of the second capacitor C2 may be obtained through the counter 154, and the processor 20 may obtain the capacitance of the second capacitor C2 according to the above-described algorithm.

For example, in some embodiments, a detection parameter value includes a voltage parameter value and a current parameter value; and a processor is configured to detect the voltage parameter value and the current parameter value. For example, the processor may be configured to: obtain a first tilt angle of a pen body according to the voltage parameter value, obtain a second tilt angle of the pen body according to the current parameter value; and calculate an average (for example, a geometric average) of the first tilt angle and the second tilt angle to obtain an average tilt angle of the pen body. The average tilt angle of the pen body can better reflect an actual tilt angle of the pen body, that is, the tilt angle of the pen body obtained according to the detection parameter value is more accurate. The processor is further configured to generate and output a driving signal, and a characteristic parameter value of the driving signal corresponds to the average tilt angle of the pen body.

For example, as shown in FIG. 1, the electronic pen further includes a transmitter 30. The transmitter 30 is configured to boost the driving signal and transmit the boosted driving signal by the pen tip 120. A connection line between the transmitter 30 and a position close to the pen tip 120 indicates that the transmitter 30 is connected with the pen tip 120. Because a voltage of the driving signal generated by the processor 20 is relatively low, the transmitter 30 is connected with the processor 20 to boost the driving signal output by the processor 20, so as to avoid a detection error due to a driving signal that is too weak to be received by a touch panel.

For example, the transmitter 30 includes a boost, and the boost is configured to boost the driving signal.

For example, in a case where the touch panel receives the driving signal emitted by the electronic pen, a handwriting of a corresponding line width may be displayed according to the characteristic parameter value of the driving signal, so that a thickness of the handwriting changes with the tilt angle of the pen body 11. The characteristic parameter value of the driving signal may be inversely proportional to the line width of the handwriting, that is, the larger the characteristic parameter value of the driving signal, the thinner the line width of the handwriting. For example, when a frequency value of the driving signal is 300 KHz, the line width of the handwriting is 0.3 mm; when the frequency value of the driving signal is 400 KHz, the line width of the handwriting is 0.2 mm; and when the frequency value of the driving signal is 500 KHz, the line width of the handwriting is 0.1 mm.

For example, on the touch panel, handwritings with different line widths may be determined according to the number of pixels displayed: the wider the line width of the handwriting, the larger the number of pixels displayed in a direction of the line width of the handwriting. For example, in a case where the line width of the handwriting is 0.3 mm, the handwriting may be displayed by the pixels with a number of N1 in the direction of the line width of the handwriting; and in a case where the line width of the handwriting is 0.2 mm, the handwriting may be displayed by the pixels with a number of N2 in the direction of the line width of the handwriting; where, N1 and N2 are both positive integers, and N1 is greater than N2. N1 and N2 may be adjusted according to actual situations, which will not be limited in the present disclosure.

For example, as shown in FIG. 1, the electronic pen further includes a power-supply module 40. The power-supply module 40 is configured to provide electric energy to the detector 10, the processor 20 and the transmitter 30. The power-supply module 40 may include a converter 41 and a power supply 42. The power supply is configured to provide stable electric energy to the electronic pen, for example, the power supply may provide electric energy to the first power supply terminal VD and the second power supply terminal VS. The power supply may supply electricity in a wired or wireless manner. The power supply may be an external direct-current (DC) or alternating-current (AC) power supply, or may also be a battery, such as a primary battery or a secondary battery. The converter may be a DC-DC converter, and is configured to perform a voltage conversion; that is, the converter may convert the electric energy provided by the power supply into voltage values required by respective components in the electronic pen.

For example, the transmitter 30 and the power-supply module 40 may also be provided within the pen body 11.

Figure 8:
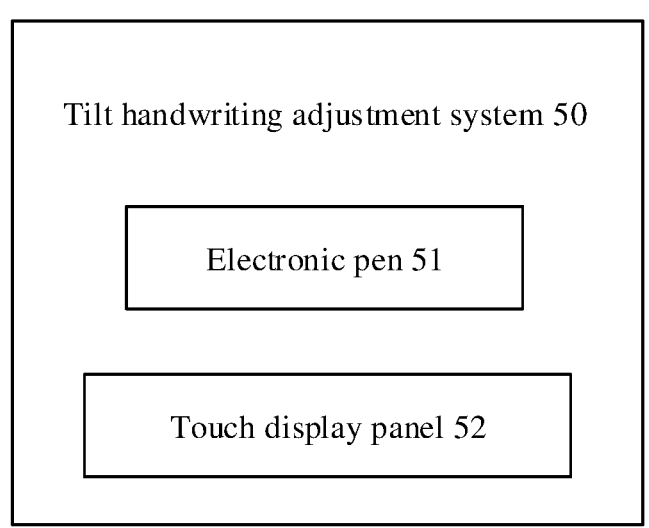
FIG. 8 is a schematic diagram of a tilt handwriting adjustment system provided by an embodiment of the present disclosure.

An embodiment of the present disclosure further provides a tilt handwriting adjustment system. FIG. 8 is a schematic diagram of the tilt handwriting adjustment system provided by the embodiment of the present disclosure.

For example, as shown in FIG. 8, the tilt handwriting adjustment system provided by the embodiment of the present disclosure includes the electronic pen 51 according to any one of the above-described embodiments and a display panel 52. The display panel 52 is configured to receive a driving signal, and adjust and display a handwriting according to a characteristic parameter value of the driving signal, and a line width of the handwriting corresponds to a tilt angle.

For example, the display panel 52 may be a touch display panel 52.

For example, the touch display panel 52 may be configured to detect the characteristic parameter value of the driving signal, to obtain the characteristic parameter value of the driving signal. But the embodiment is not limited thereto, the processor in the electronic pen 51 may also process the driving signal and obtain the characteristic parameter value of the driving signal, and then the transmitter may transmit the driving signal and the characteristic parameter values of the driving signal to the touch display panel 52, so that the touch display panel 52 may directly obtain the characteristic parameter value of the driving signal from the electronic pen 51.

For example, the larger the tilt angle of the pen body, the smaller the line width of the handwriting.

For example, a corresponding relationship between the line width of the handwriting and the characteristic parameter value of the driving signal may be preset and stored in a memory of the touch display panel 52.

For example, the touch display panel 52 may adopt a mutual capacitance touch technology.

For example, the touch display panel 52 and the electronic pen 51 may communicate with each other in a wireless manner.

For example, the touch display panel 52 may be applied to a mobile phone, a tablet personal computer, a television, a drawing board, a monitor, a laptop, a digital photo frame, a navigator, and any other product or component having a touch display function.

Figure 9:
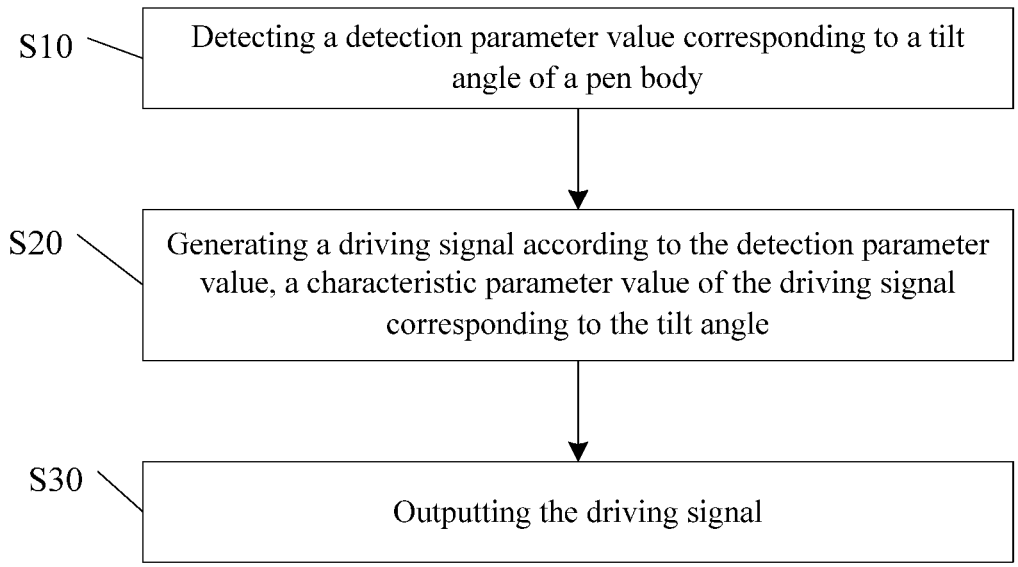
FIG. 9 is a flow chart of a tilt handwriting adjustment method of an electronic pen provided by an embodiment of the present disclosure.

An embodiment of the present disclosure further provides a tilt handwriting adjustment method of the electronic pen according to any one of the above. FIG. 9 is a flow chart of the tilt handwriting adjustment method of the electronic pen provided by the embodiment of the present disclosure.

For example, as shown in FIG. 9, the tilt handwriting adjustment method provided by the embodiment of the present disclosure includes:

S10: detecting a detection parameter value corresponding to a tilt angle of a pen body;

S20: generating a driving signal according to the detection parameter value, a characteristic parameter value of the driving signal corresponding to the tilt angle; and S30: outputting the driving signal.

For example, in some examples, the detection parameter value may be a voltage parameter value. In the examples shown in FIG. 3 and FIG. 4, step S10 may include: detecting a voltage value at a slider of a sliding resistor, the voltage parameter value including the voltage value at the slider. For example, the voltage value at the slider is equal to a voltage value at a node A. In the example shown in FIG. 5, step S10 may include: detecting a pressure voltage value of a piezoelectric sheet, the voltage parameter value including the pressure voltage value.

For example, in other examples, the detection parameter value may be a current parameter value. In the example shown in FIG. 6, step S10 may include: detecting a value of a current flowing through a fixed-value resistor, the current parameter value including the value of the current flowing through the fixed-value resistor. For example, the value of the current flowing through the fixed-value resistor may be equal to a current value at a second end of the sliding resistor, that is to say, step S10 may include: detecting the current value at the second end of the sliding resistor to determine the current parameter value.

For example, in step S20, the characteristic parameter value of the driving signal may include a frequency value and an amplitude value, etc. of the driving signal.

It should be noted that, for detailed description of a relationship between the detection parameter value and the driving signal, and a relationship between the detection parameter value and the tilt angle, etc. related description in the above-described embodiment of the electronic pen may be referred to, and no details will be repeated here.

For example, step S30 may include: boosting the driving signal by a transmitter, and transmitting the boosted driving signal via a pen tip of the electronic pen.

Figure 10:
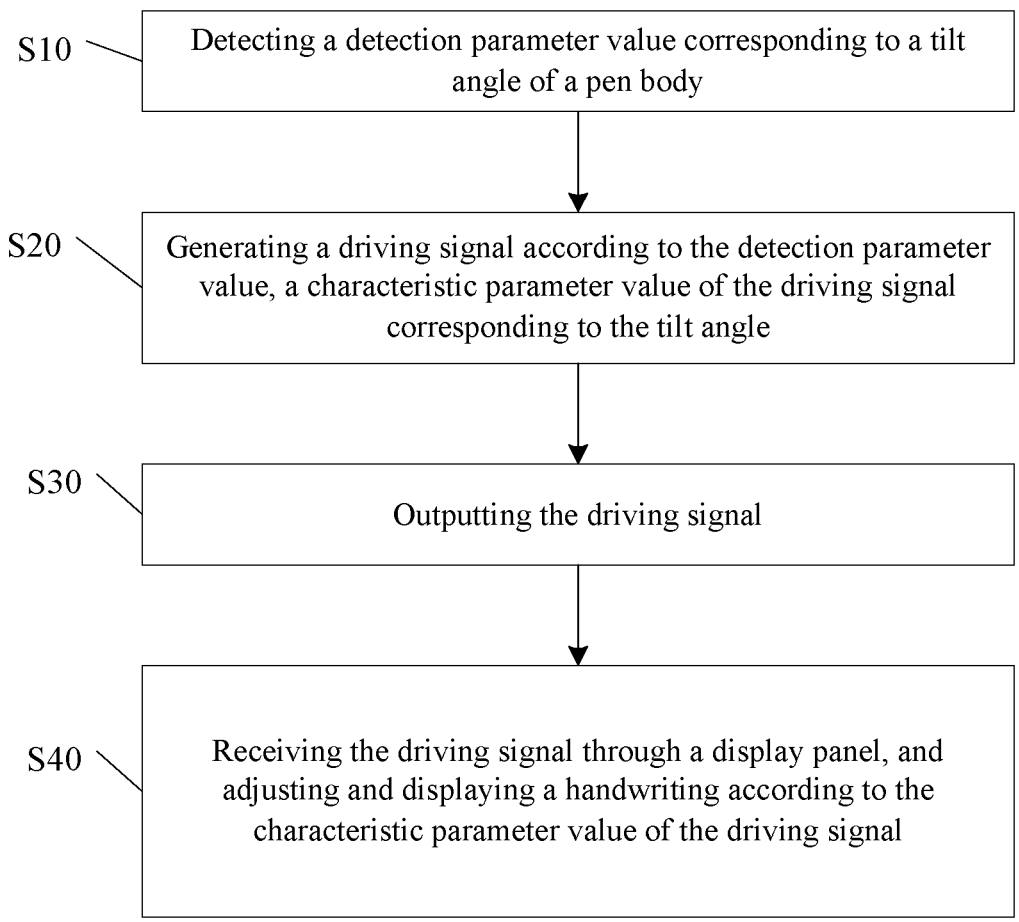
FIG. 10 is a flow chart of a tilt handwriting adjustment method provided by an embodiment of the present disclosure.

An embodiment of the present disclosure further provides a tilt handwriting adjustment method. FIG. 10 is a flow chart of the tilt handwriting adjustment method provided by the embodiment of the present disclosure.

For example, as shown in FIG. 10, the tilt handwriting adjustment method provided by the embodiment of the present disclosure includes:

S10: detecting a detection parameter value corresponding to a tilt angle of a pen body;

S20: generating a driving signal according to the detection parameter value, a characteristic parameter value of the driving signal corresponding to the tilt angle;

S30: outputting the driving signal;

S40: receiving the driving signal through a display panel, and adjusting and displaying a handwriting according to the characteristic parameter value of the driving signal.

For example, for detailed description of step S10, step S20 and step S30, etc., related description in the above-described embodiment of the tilt handwriting adjustment method may be referred to, and no details will be repeated here.

For example, in step S40, the larger the tilt angle of the pen body, the smaller the line width of the handwriting. For a corresponding relationship between the line width of the handwriting and the characteristic parameter value of the driving signal, related description in the above-described embodiment of the electronic pen may be referred to, and no details will be repeated here.

It should be noted that, for detailed description of step S40, related description in the above-described embodiment of the tilt handwriting adjustment system may be referred to, and no details will be repeated here.

The following points need to be explained:

(1) In the drawings of the embodiments of the present disclosure, only the structures related to the embodiments of the present disclosure are involved, and other structures may refer to the common design.

(2) Without conflict, features in the same embodiment and different embodiments of the present disclosure can be combined with each other.

The foregoing is only specific embodiments of the present disclosure, but the protection scope of the present disclosure is not limited thereto. The scope of protection of the present disclosure shall be defined by the claims.

What is claimed is:

1. An electronic pen, comprising:
a pen body; and
a detector and a processor provided within the pen body,
wherein the detector is configured to detect a tilt angle of the pen body with respect to a writing plane, and output a corresponding detection parameter valued,
the processor is configured to acquire the detection parameter value, and generate and output a driving signal according to the detection parameter value, and a characteristic parameter value of the driving signal corresponds to the tilt angle,
the detection parameter value comprises a voltage parameter value, and the processor is configured to acquire the voltage parameter value, and generate and output the driving signal according to the voltage parameter value,
the detector comprises a sliding resistance component, and the sliding resistance component comprises a sliding resistor and a slider,
a first end of the sliding resistor is configured to be electrically connected with a first power supply terminal, and a second end of the sliding resistor is configured to be electrically connected with a second power supply terminal, and
the slider is configured to slide on the sliding resistor as the tilt angle of the pen body changes.

2. The electronic pen according to claim 1, wherein a cross-sectional shape of the sliding resistor that is cut by a plane parallel to a central axis of the pen body is an arc shape, the slider is coupled to the processor through a connecting rod,
and a material of the connecting rod comprises a conductive material,
the first end of the sliding resistor is one end of the arc shape, and the second end of the sliding resistor is the other end of the arc shape.

3. The electronic pen according to claim 2, wherein resistance between the first end of the sliding resistor and a contact point of the slider and the sliding resistor has a first resistance value, resistance between the second end of the sliding resistor and the contact point of the slider and the sliding resistor has a second resistance value, and a relationship among the tilt angle, the first resistance value and the second resistance value is:

$$R11:R12 = (\beta - \alpha):\alpha,$$

where, R11 represents the first resistance value, R12 represents the second resistance value, α represents the tilt angle, and β represents a radian corresponding to an arc line between the first end of the sliding resistor and the second end of the sliding resistor.

4. The electronic pen according to claim 3, wherein the detector further comprises a fixed-value resistor; the sliding resistor and the fixed-value resistor are arranged in series between the first power supply terminal and the second power supply terminal; and a relationship between the tilt angle and the voltage parameter value is:

$$V0 = \frac{(V1 - V2) \times \left(\frac{\alpha \cdot R1}{\beta} + R2\right)}{(R1 + R2)},$$

where, V0 represents the voltage parameter value; V1 represents a first power supply voltage output from the first power supply terminal; V2 represents a second power supply voltage output from the second power supply terminal, the first power supply voltage and the second power supply voltage are different from each other; R1 represents a fixed resistance value of the sliding resistor, R1=R11+R12; and R2 represents a resistance value of the fixed-value resistor.

5. The electronic pen according to claim 1, wherein a shape of the sliding resistor is a hollow hemispherical shell; a symmetry axis of the sliding resistor is a central axis of the pen body; the slider is coupled to the processor through a connecting rod; and a material of the connecting rod comprises a conductive material,
the first end of the sliding resistor is a vertex of the hollow hemispherical shell, and the second end of the sliding resistor is any point of an edge of the hollow hemispherical shell.

6. The electronic pen according to claim 1, wherein a line width of a handwriting scribed by the electronic pen is configured to be negatively correlated with the tilt angle.

7. A tilt handwriting adjustment system, comprising: a display panel, and the electronic pen according to claim 1, wherein the display panel is configured to receive the driving signal, and adjust and display a handwriting according to the characteristic parameter value of the driving signal; and a line width of the handwriting corresponds to the tilt angle.

8. An adjustment method of the tilt handwriting adjustment system according to claim 7, comprising:
   detecting the detection parameter value corresponding to the tilt angle of the pen body;
   generating the driving signal according to the detection parameter value, the characteristic parameter value of the driving signal corresponding to the tilt angle;
   outputting the driving signal; and
   receiving the driving signal by the display panel, and adjusting and displaying the handwriting according to the characteristic parameter value of the driving signal.

9. A tilt handwriting adjustment method of the electronic pen according to claim 1, comprising:
   detecting the detection parameter value corresponding to the tilt angle of the pen body;
   generating the driving signal according to the detection parameter value, the characteristic parameter value of the driving signal corresponding to the tilt angle; and
   outputting the driving signal.

10. An electronic pen, comprising:
   a pen body; and
   a detector and a processor provided within the pen body,
   wherein the detector is configured to detect a tilt angle of the pen body with respect to a writing plane, and output a corresponding detection parameter value,
   the processor is configured to acquire the detection parameter value, and generate and output a driving signal according to the detection parameter value, and a characteristic parameter value of the driving signal corresponds to the tilt angle,
   the detection parameter value comprises a current parameter value; and the processor is configured to acquire the current parameter value, and generate and output the driving signal according to the current parameter value,
   the detector comprises a sliding resistance component and a fixed-value resistor,
   the sliding resistance component comprises a sliding resistor and a slider,
   a first end of the sliding resistor is grounded, and a second end of the sliding resistor is grounded through the fixed-value resistor,
   the slider is coupled to the pen body through a connecting rod and is electrically connected with a first power supply terminal, the slider is configured to slide on the sliding resistor as the tilt angle of the pen body changes, and
   the current parameter value comprises a value of a current flowing through the fixed-value resistor.

* * * * *